(12) United States Patent
Hsu

(10) Patent No.: US 8,769,337 B2
(45) Date of Patent: Jul. 1, 2014

(54) DETECTION METHOD FOR CONFIGURATION OF POWER SUPPLY UNITS AND DETECTION SYSTEM USING THE SAME

(75) Inventor: Hsin-Jung Hsu, Taipei (TW)

(73) Assignee: Inventec Corporation, Taipei (TW)

( * ) Notice: Subject to any disclaimer, the term of this patent is extended or adjusted under 35 U.S.C. 154(b) by 790 days.

(21) Appl. No.: 12/982,807

(22) Filed: Dec. 30, 2010

(65) Prior Publication Data

US 2012/0131394 A1 May 24, 2012

(30) Foreign Application Priority Data

Nov. 23, 2010 (TW) ................................ 99140430 A

(51) Int. Cl.
*G06F 11/00* (2006.01)
(52) U.S. Cl.
USPC .......................................................... 714/14
(58) Field of Classification Search
CPC .... G06F 11/2015; G06F 1/30; G06F 11/1441
USPC .......................................................... 714/14
See application file for complete search history.

(56) References Cited

U.S. PATENT DOCUMENTS

| | | | | |
|---|---|---|---|---|
| 6,144,214 A | * | 11/2000 | Athan | 324/750.3 |
| 7,449,797 B2 | * | 11/2008 | Takahashi | 307/52 |
| 7,478,251 B1 | * | 1/2009 | Diab et al. | 713/300 |
| 7,949,897 B2 | * | 5/2011 | Fujimoto | 714/14 |
| 7,957,862 B2 | * | 6/2011 | Kaita et al. | 701/34.3 |
| 8,108,720 B2 | * | 1/2012 | Beattie et al. | 714/14 |
| 2005/0229037 A1 | * | 10/2005 | Egan et al. | 714/14 |
| 2007/0260918 A1 | * | 11/2007 | Okada et al. | 714/14 |

* cited by examiner

*Primary Examiner* — Amine Riad
(74) *Attorney, Agent, or Firm* — CKC & Partners Co., Ltd.

(57) ABSTRACT

A detection method for configuration of power supply units and a detection system using the same are provided. The detection method includes: storing a production information setting about configuration of power supply units in a field replace unit, in which the production information setting includes a number setting and a location setting; sensing actual configuration number and location of the power supply units by a sensing unit so as to obtain an actual configuration information; and reading the production information setting and the actual configuration information and comparing them by a controller, in which the controller determines that the detection is passed when the actual configuration information matches the number setting and the location setting; and the controller outputs an unusual message when the actual configuration information does not match the number setting and the location setting.

9 Claims, 5 Drawing Sheets

DETECTION METHOD FOR CONFIGURATION OF POWER SUPPLY UNITS AND DETECTION SYSTEM USING THE SAME

CROSS-REFERENCE TO RELATED APPLICATION

This application claims the priority benefit of Taiwan application serial no. 99140430, filed on Nov. 23, 2010. The entirety of the above-mentioned patent application is hereby incorporated by reference herein and made a part of this specification.

BACKGROUND OF THE INVENTION

1. Field of the Invention

The present invention generally relates to a detection technique, in particular, to a detection method for configuration of power supply units (PSUs) and a detection system using the same.

2. Description of Related Art

A server is configured with many kinds of hardware, among which the most important is PSUs. The configuration of PSUs may be a single PSU configuration, a dual PSU configuration, or a multi PSU configuration. Incorrect PSU configuration may affect the quality of the server, for example, the start-up fails, the set value is wrong, or the configuration location of PSUs is wrong.

Currently, the PSU configuration is checked manually by inserting jumps according to the single, dual, or multi PSU configuration, and then visually checking whether the number and location in the PSU configuration are correct. According to a location where a jump is inserted, a controller in a conventional server only can identify whether PSUs exist at the target location, but cannot identify the actual number of the PSUs. The controller also cannot know whether the location of any jump is wrong. Thus, manual check is required to check whether any jump is placed at a wrong location and check the configuration number of PSUs. However, the manual check depends on the degree of strictness of an operator, so the production quality of the PSU configuration of the server is hard to handle, and the problem is especially hard to track after shipment. Moreover, high labor and operating costs are spent in checking the problem of the server.

Therefore, how to realize a detection method for configuration of PSUs to determine that both the number and location of the configured PSUs are correct, thus improving the quality of hardware configuration is a problem to be overcome.

SUMMARY OF THE INVENTION

Accordingly, the present invention is directed to a detection method for configuration of PSUs and a detection system using the same, capable of effectively solving the problems in the prior art.

The present invention provides a detection method for configuration of PSUs, which includes: storing a production information setting about configuration of PSUs in a field replace unit, in which the production information setting includes a number setting and a location setting; sensing actual configuration number and location of the PSUs by a sensing unit so as to obtain an actual configuration information; and reading the production information setting and the actual configuration information and comparing them by a controller, in which the controller determines that the detection is passed when the actual configuration information matches the number setting and the location setting; and the controller outputs an unusual message when the actual configuration information does not match the number setting or the location setting.

The present invention further provides a detection system, which includes: a field replace unit, for storing a production information setting about configuration of PSUs, in which the production information setting includes a number setting and a location setting; a sensing unit, for sensing actual number and location of the PSUs so as to obtain an actual configuration information; and a controller, coupled to the field replace unit and the sensing unit, for reading the production information setting and the actual configuration information and comparing them, in which the controller determines that the detection is passed when the actual configuration information matches the number setting and the location setting; and the controller outputs an unusual message when the actual configuration information does not match the number setting or the location setting.

The present invention further provides a detection system, which includes: a field replace unit, for storing a production information setting about configuration of PSUs, in which the production information setting includes a number setting and a location setting; a sensing unit, for sensing actual number and location of the PSUs so as to obtain an actual configuration information; and a controller, coupled to the field replace unit and the sensing unit, for reading the production information setting and the actual configuration information and comparing them, in which the sensing unit comprises: a first sensor, for sensing the actual configuration number of the PSUs; and a second sensor for sensing the actual configuration location of the PSUs; in which the controller determines that a detection of the first sensor is corrected when the actual configuration number of the PSUs matches the number setting, and then the controller reads actual configuration location of the PSUs by the second sensor.

In an embodiment of the present invention, the field replace unit is an electrically erasable programmable read only memory (EEPROM).

In an embodiment of the present invention, the controller is a baseboard management controller or a fan controller.

In an embodiment of the present invention, the sensing unit includes a first sensor and a second sensor, the first sensor is used for sensing the actual configuration number of the PSUs, and the second sensor is used for sensing the actual configuration location of the PSUs.

In an embodiment of the present invention, the controller outputs a detection result through an input/output interface.

Based on the above, in the present invention, the production information setting about configuration of the PSUs is stored in the field replace unit, the sensing unit is used to obtain the actual configuration number and location of the PSUs by sensing, and the controller is used to compare the production information setting with the actual configuration information. In this way, automatic detection is realized, and the setting of inserting jumps manually and manual detection are omitted, thus improving the production quality of the PSU configuration, and reducing the operating cost.

In order to make the aforementioned and other objectives, features and advantages of the present invention comprehensible, embodiments accompanied with figures are described in detail below.

BRIEF DESCRIPTION OF THE DRAWINGS

The accompanying drawings are included to provide a further understanding of the invention, and are incorporated

DESCRIPTION OF THE EMBODIMENTS

Figure 1:
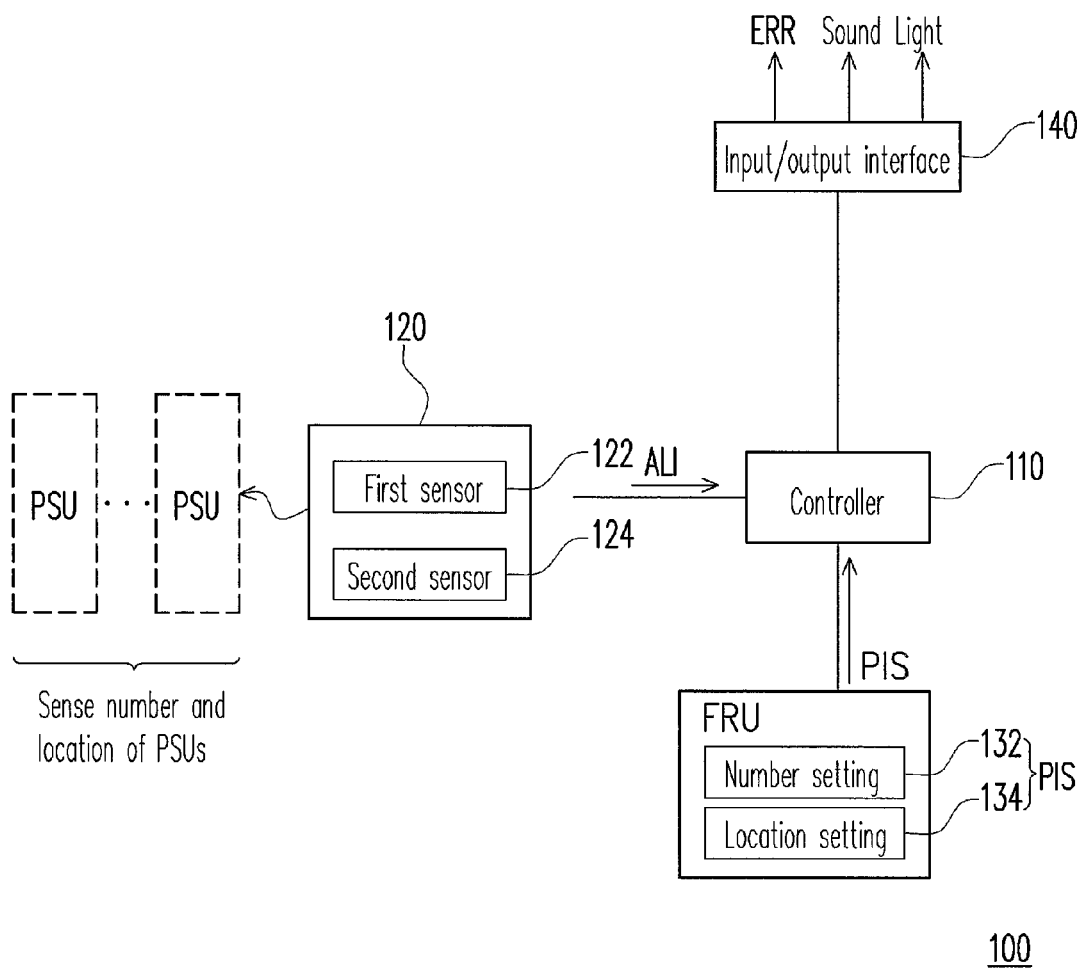
FIG. 1 is a schematic view of a detection system according to an embodiment of the present invention.

Reference will now be disclosed in detail to the present embodiments of the invention, examples of which are illustrated in the accompanying drawings. Wherever possible, the same reference numbers are used in the drawings and the description to refer to the same or like parts.

FIG. 1 is a schematic view of a detection system according to an embodiment of the present invention. Referring to FIG. 1, the detection system 100 in this embodiment may be applied in a server production line. Since the PSU configuration of the server may be a single, dual, or multi PSU configuration, the actual configuration number and location of PSUs need to be checked by the detection system 100 carefully, so as to know the configuration status of PSUs clearly.

The detection system 100 may include a field replace unit FRU, a sensing unit 120, and a controller 110. The field replace unit FRU stores a production information setting PIS about configuration of PSUs, in which the production information setting PIS includes a number setting 132 and a location setting 134 of the PSUs, and the production information setting PIS is independent of firmware. In this embodiment, the field replace unit FRU may be, but is not limited to, an EEPROM. The sensing unit 120 may be used for sensing actual number and location of PSUs so as to obtain an actual configuration information ALI.

In the detection system 100, the controller 110 is coupled to the field replace unit FRU and the sensing unit 120. The controller 110 may read the production information setting PIS and the actual configuration information ALI, and compare the two batches of information. When the actual configuration information ALI matches the number setting 132 and the location setting 134 of the PSUs, the controller 110 may determine that the detection of the PSU configuration is passed, and then the subsequent manufacturing process can be performed in the server production line. When the comparison is unusual, it indicates that the actual configuration information ALI does not match the number setting 132 or the location setting 134, and the controller 110 may output an unusual message ERR, so as to notify personnel of the server production line to correct the error.

In another embodiment, the sensing unit 120 may include a first sensor (number sensor) 122 and a second sensor (location sensor) 124. The first sensor (number sensor) 122 may be used for sensing the actual configuration number of the PSUs; a specific signal is passed to the fan control board (FCB) when the connected PSU is on. The second sensor (location sensor) 124 may be used for sensing the actual configuration location of the PSUs. In general, the second sensor 124 works for PSU connections checking, the second sensor 122 shows working status to FCB, and then FCB will pass those information to BIOS and BMC.

Moreover, the detection system 100 may further include an input/output interface 140, and the controller 110 may output a detection result, for example, the unusual message ERR or the message indicating that the detection is passed, through the input/output interface 140. The input/output interface 140 may include a network connection port (not shown) so as to transfer the detection result to a connected host, for example, notify the unusual message ERR to personnel on the production line to correct the error or notify personnel that the detection of the PSU configuration is passed. The input/output interface 140 may also make output according to the detection result. For example, light of different colors or sounds of different frequencies may indicate that the detection is passed or failed.

It should be noted that, although several possible forms of the detection system have been described in the above embodiment, the application of the present invention is not thus limited. In the embodiment, the conventional method of inserting jumps manually is omitted, and manual check of the PSU configuration is unnecessary, thus avoiding errors in the insertion of jumps and inaccurate check; moreover, the detection system can output the detection result.

The circuit structure of the server may include a mother board and a fan control board for controlling a fan. Generally, PSUs may be configured beside the fan control board. Several embodiments will be provided below to enable those of ordinary skill in the art to further understand the spirit of the present invention and implement the present invention.

Figure 2:
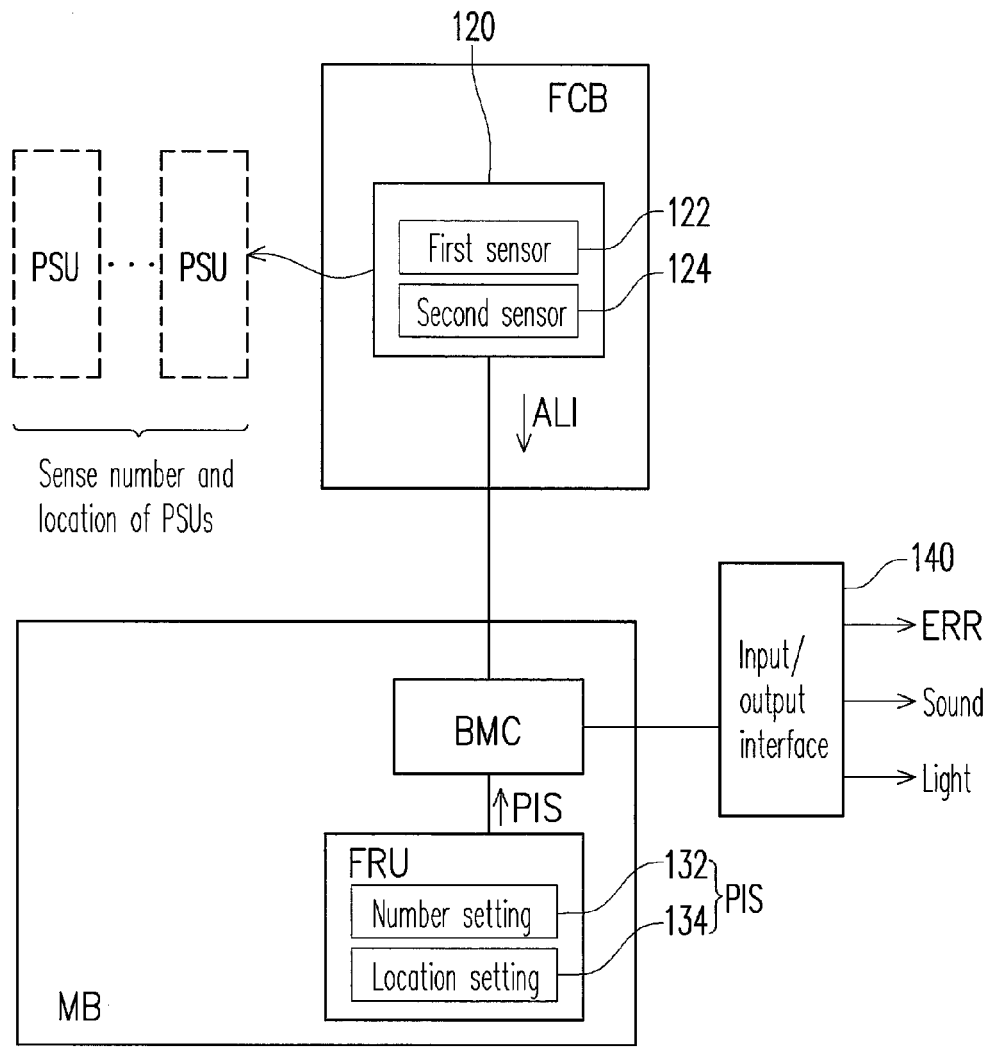
FIG. 2 is a schematic view of a detection system according to another embodiment of the present invention.

Based on the teachings of the above embodiment, FIG. 2 is a schematic view of a detection system according to another embodiment of the present invention. Referring to FIG. 2, in this embodiment, the detection system 200 may include a mother board MB, a fan control board FCB, and an input/output interface 140. The difference between FIG. 2 and FIG. 1 lies in that, the controller 110 may be implemented by a baseboard management controller BMC on the mother board MB, in which the baseboard management controller BMC is further responsible for managing and controlling hardware and peripheral circuits on the mother board; the field replace unit FRU may be configured on the mother board MB; and the sensing unit 120 is configured on the fan control board FCB so as to detect the number and location of PSUs nearby. In this way, the effects similar to those in the above embodiment can also be achieved.

Figure 3:
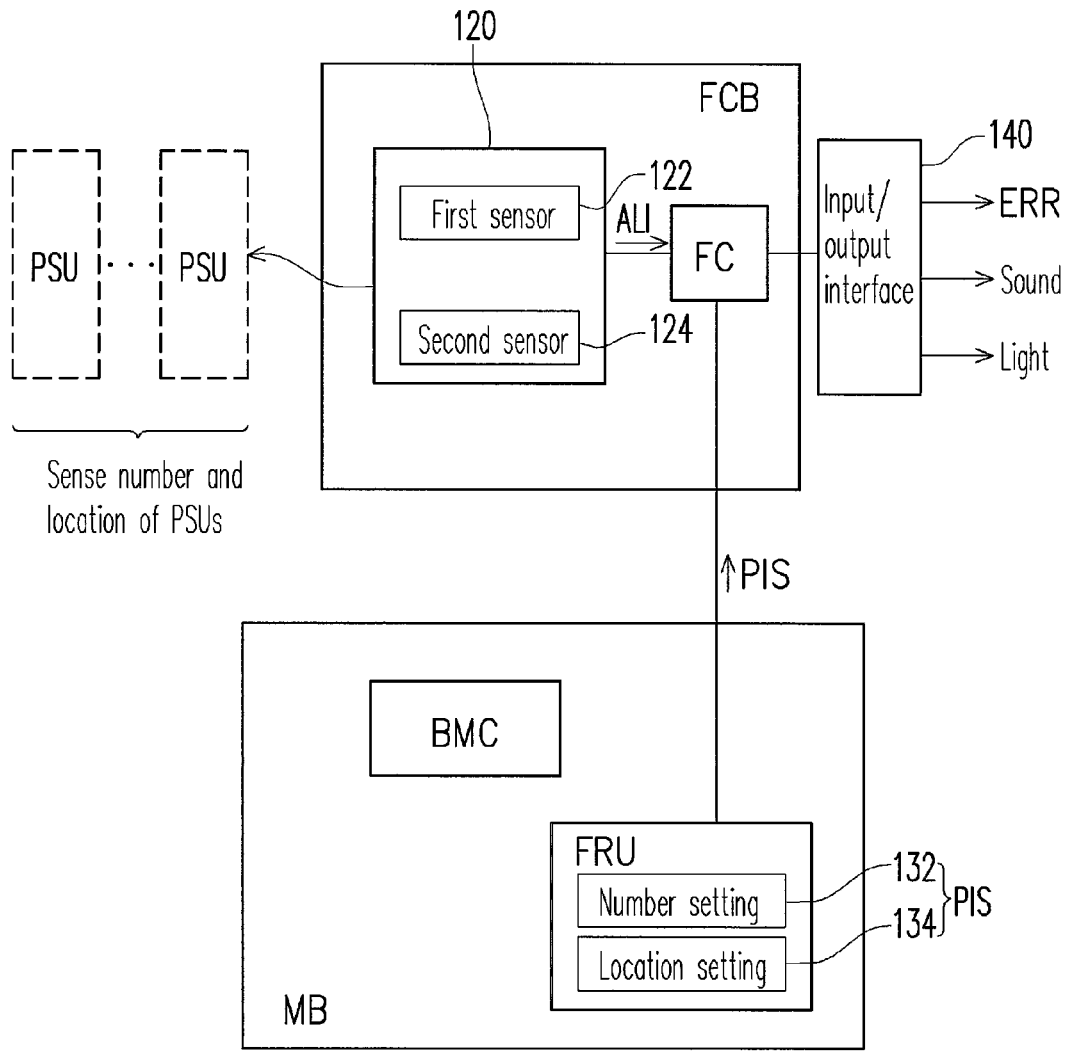
FIG. 3 is a schematic view of a detection system according to another embodiment of the present invention.

FIG. 3 is a schematic view of a detection system according to another embodiment of the present invention. Referring to FIG. 3, in this embodiment, the detection system 300 includes a mother board MB, a fan control board FCB, and an input/output interface 140. The difference between FIG. 3 and FIG. 1 lies in that, the controller 110 may be implemented by a fan controller FC on the fan control board FCB; the sensing unit 120 is configured on the fan control board FCB so as to detect the number and location of PSUs nearby; and the field replace unit FRU may be configured on the mother board MB. In this way, the effects similar to those in the above embodiments can also be achieved.

The difference between FIG. 3 and FIG. 2 lies in that, in FIG. 2, the baseboard management controller BMC is responsible for reading the production information setting PIS and the actual configuration information ALI, and comparing the two batches of information, while in FIG. 3, the fan controller FC not only controls the operation of a fan, but also is responsible for reading the production information setting PIS and the actual configuration information ALI, and comparing the two batches of information.

Figure 4:
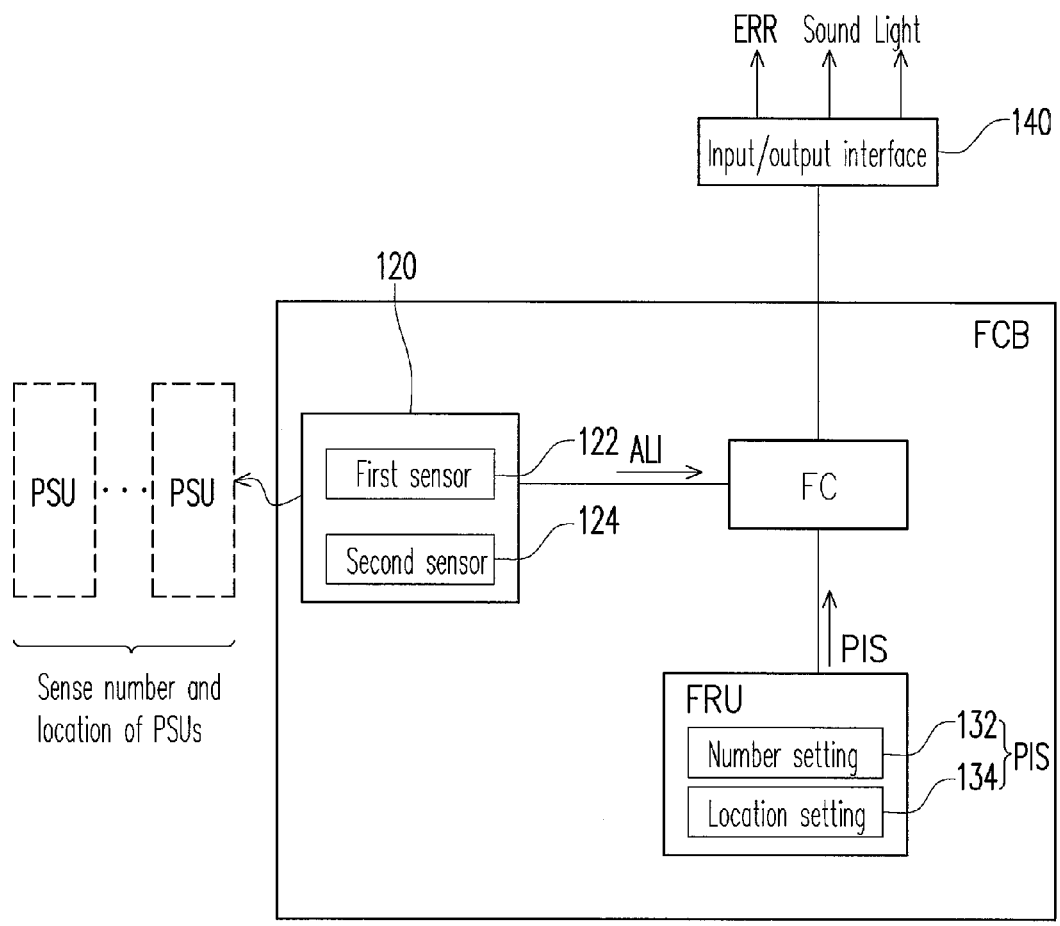
FIG. 4 is a schematic view of a detection system according to another embodiment of the present invention.

Based on the teachings of the above embodiments, FIG. 4 is a schematic view of a detection system according to another embodiment of the present invention. Referring to FIG. 4, in this embodiment, the detection system 400 may include a fan control board FCB and an input/output interface 140. The difference between FIG. 4 and FIG. 1 lies in that, the controller 110 may be implemented by a fan controller FC on the fan control board FCB; the sensing unit 120 and the field replace unit FRU are also configured on the fan control board FCB. Thus, on the fan control board FCB, the fan controller FC not only controls the operation of a fan, but also reads the production information setting PIS and the actual configuration information ALI. Moreover, in this embodiment, since the field replace unit FRU is configured on the fan control board FCB, the fan controller FC can know the production information setting PIS without the mother board. In this way, the effects similar to those in the above embodiments can also be achieved.

Based on the above, the controller 110 may be located on the mother board MB or the fan control board FCB, that is, the controller 110 may be the baseboard management controller BMC or the fan controller FC. The detection systems shown in FIGS. 2 to 4 are just several embodiments, and the present invention is not thus limited.

Figure 5:
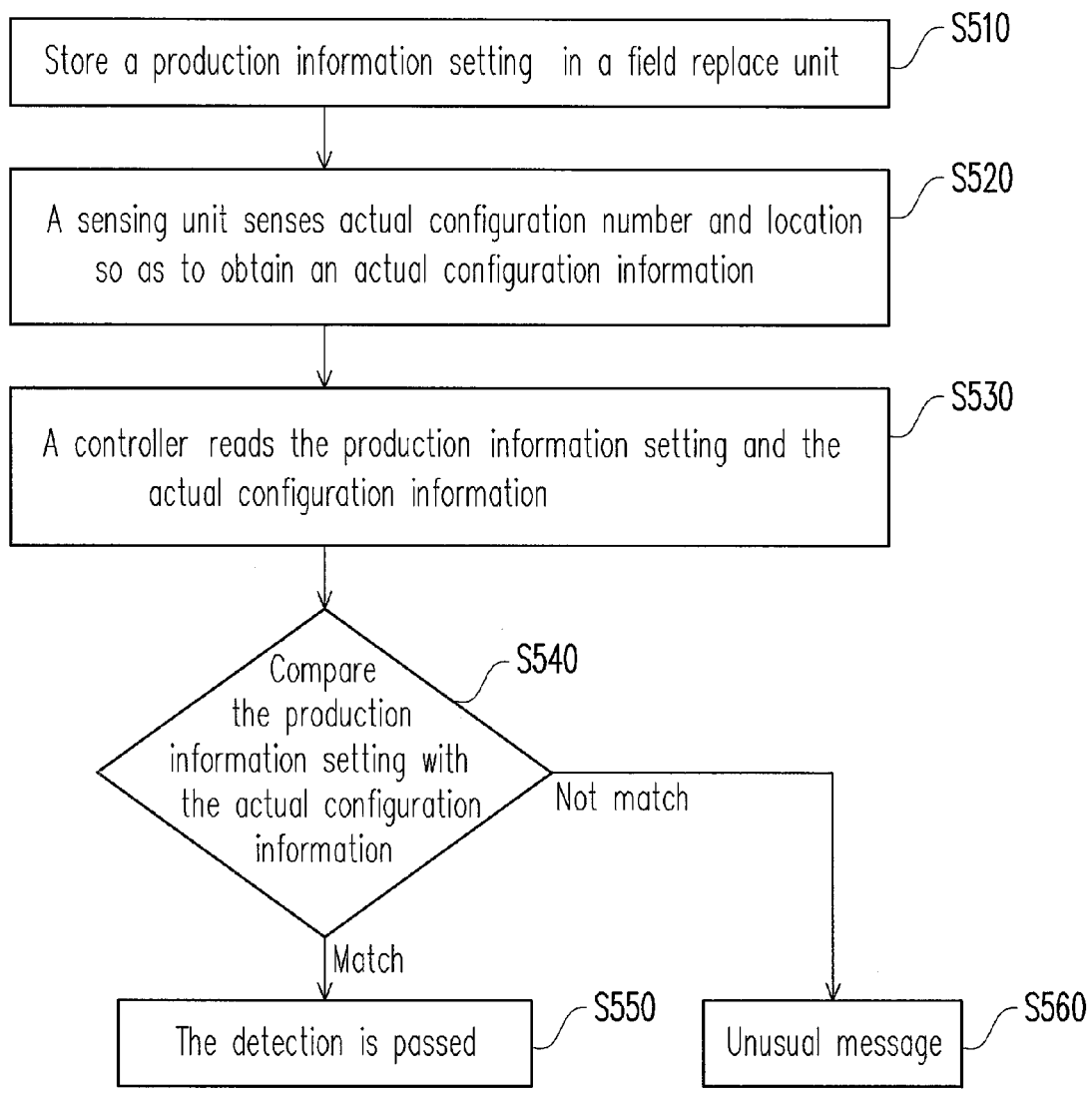
FIG. 5 is a schematic view illustrating a flow of a detection method for configuration of PSUs according to an embodiment of the present invention.

Based on the teachings of the above embodiments, FIG. 5 is a schematic view illustrating a flow of a detection method for configuration of PSUs according to an embodiment of the present invention. Referring to FIG. 5, firstly, a production information setting is stored in a field replace unit, in which the production information setting includes a number setting of PSUs and a location setting of the PSUs (Step S510). Then, a sensing unit senses actual configuration number and location so as to obtain an actual configuration information (Step S520). Next, a controller reads the production information setting and the actual configuration information (Step S530). Afterwards, the controller compares the production information setting with the actual configuration information (Step S540). The controller determines that the detection is passed when the actual configuration information matches the number setting and the location setting of the PSUs (Step S550). The controller outputs an unusual message so as to notify personnel to make correction when the actual configuration information does not match the number setting or the location setting (Step S560).

Several embodiments will be provided below to enable those of ordinary skill in the art to further understand the spirit of the present invention and implement the present invention.

More particularly, referring to FIGS. 1 and 5 together, the detection method is implemented in the detection system 100 as follows. When Step S510 is performed, the field replace unit FRU may be an EEPROM, a production information setting PIS independent of firmware is stored in the EEPROM, and the production information setting PIS includes a number setting 132 and a location setting 134 of PSUs. Then, Step S520 is performed, in which the sensing unit 120 senses actual configuration number and location so as to obtain an actual configuration information ALI. Next, Step S530 is performed, in which the controller 110 reads the production information setting PIS and the actual configuration information ALI. Afterwards, Step S540 is performed, in which the controller 110 compares the production information setting PIS with the actual configuration information ALI. When the actual configuration information ALI matches the number setting 132 and the location setting 134 of the PSUs, the flow enters Step S550, in which the controller 110 determines that the detection is passed. When the comparison is unusual, it indicates that the actual configuration information does not match the number setting 132 or the location setting 134 of the PSUs, and the flow enters Step S560, in which the controller may output an unusual message ERR. In this way, the effects similar to those in the above embodiments can also be achieved.

Referring to the aforementioned embodiments, the controller 110 may be located on the mother board MB or the fan control board FCB, that is, the controller 110 may be the baseboard management controller BMC or the fan controller FC. The sensing unit 120 may include the first sensor 122 for sensing the actual configuration number of the PSUs and the second sensor 124 for sensing the actual configuration location of the PSUs. The detection system 100 may further include the input/output interface 140, and the controller 110 may output the detection result through the input/output interface 140. Of course, the input/output interface 140 may indicate that the detection is passed or failed with light of different colors or sounds of different frequencies. The present invention is not thus limited.

Based on the above, in the present invention, the production information setting about configuration of the PSUs is stored in the field replace unit, the sensing unit is used to obtain the actual configuration number and location of the PSUs, and the controller is used to compare the production information setting with the actual configuration information. In this way, automatic detection is realized, and the setting of inserting jumps manually and manual detection are omitted, thus improving the production quality of the PSU configuration, and reducing the operating cost.

In addition, the embodiments of the present invention at least have the following effects.

1. The production quality of the PSU configuration of the server can be handled accurately, and questions can be gathered for solving the condition.

2. The problem of PSU configuration can be solved effectively, thus improving the processing efficiency.

3. The cause of the problem of PSU configuration can be tracked, so as to avoid repeated failures.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A detection method for configuration of power supply units (PSUs), comprising:
   storing a production information setting about configuration of PSUs in a field replace unit, wherein the production information setting comprises a number setting and a location setting and the field replace unit is an electrically erasable programmable read only memory (EEPROM);
   sensing actual configuration number and location of the PSUs by a sensing unit so as to obtain an actual configuration information; and
   reading the production information setting and the actual configuration information and comparing them by a controller, wherein the controller is a baseboard management controller or a fan controller;
   wherein the controller determines that the detection is passed when the actual configuration information matches the number setting and the location setting; and the controller outputs an unusual message when the actual configuration information does not match the number setting or the location setting.

2. The detection method for configuration of PSUs according to claim 1, wherein the sensing unit comprises a first sensor for sensing the actual configuration number of the PSUs and a second sensor for sensing the actual configuration location of the PSUs.

3. The detection method for configuration of PSUs according to claim 1, wherein the controller outputs a detection result through an input/output interface.

4. The detection method for configuration of PSUs according to claim 1, wherein the field replace unit is an electrically erasable programmable read only memory (EEPROM), the controller is a baseboard management controller or a fan controller, the sensing unit comprises a first sensor for sensing the actual configuration number of the PSUs and a second sensor for sensing the actual configuration location of the PSUs, and the controller outputs a detection result through an input/output interface.

5. A detection system, comprising:
a field replace unit, for storing a production information setting about configuration of power supply units (PSUs), wherein the production information setting comprises a number setting and a location setting, and the field replace unit is an electrically erasable programmable read only memory (EEPROM);
a sensing unit, for sensing actual number and location of the PSUs so as to obtain an actual configuration information; and
a controller, coupled to the field replace unit and the sensing unit, for reading the production information setting and the actual configuration information and comparing them, wherein the controller is a baseboard management controller or a fan controller;
wherein the controller determines that the detection is passed when the actual configuration information matches the number setting and the location setting; and the controller outputs an unusual message when the actual configuration information does not match the number setting or the location setting.

6. The detection system according to claim 5, wherein the sensing unit comprises:
a first sensor, for sensing the actual configuration number of the PSUs; and
a second sensor for sensing the actual configuration location of he PSUs.

7. The detection system according to claim 5, wherein the detection system further comprises an input/output interface, and the controller outputs a detection result through the input/output interface.

8. The detection system according to claim 5, wherein the field replace unit is an electrically erasable programmable read only memory (EEPROM), the controller is a baseboard management controller or a fan controller;
wherein the sensing unit comprises:
a first sensor, for sensing the actual configuration number of the PSUs; and
a second sensor for sensing the actual configuration location of the PSUs; and
wherein the detection system further comprises an input/output interface, and the controller outputs a detection result through the input/output interface.

9. A detection system, comprising:
a field replace unit, for storing a production information setting about configuration of power supply units (PSUs), wherein the production information setting comprises a number setting and a location setting;
a sensing unit, for sensing actual number and location of the PSUs so as to obtain an actual configuration information; and
a controller, coupled to the field replace unit and the sensing unit, for reading the production information setting and the actual configuration information and comparing them;
wherein the sensing unit comprises: a first sensor, for sensing the actual configuration number of the PSUs; and a second sensor for sensing the actual configuration location of the PSUs; and
wherein the controller determines that a detection o he first sensor is corrected when the actual configuration number of the PSUs matches the number setting, and then the controller reads actual configuration location of the PSUs by the second sensor.

* * * * *